(12) United States Patent
Kojima

(10) Patent No.: US 6,914,621 B2
(45) Date of Patent: Jul. 5, 2005

(54) SHADING CORRECTION METHOD FOR HEAT DEVELOPMENT RECORDING APPARATUS AND HEAT DEVELOPMENT RECORDING APPARATUS

(75) Inventor: Tetsuya Kojima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/631,015

(22) Filed: Jul. 31, 2003

(65) Prior Publication Data
US 2004/0130611 A1 Jul. 8, 2004

(30) Foreign Application Priority Data

Jul. 31, 2002 (JP) .................................... P2002-224103

(51) Int. Cl.⁷ ................................................ B41J 2/47
(52) U.S. Cl. ...................................... 347/251; 347/240
(58) Field of Search ............................... 347/228, 234, 347/248, 240, 251; 358/504, 518, 521–523, 534; 382/275; 380/274

(56) References Cited

U.S. PATENT DOCUMENTS

| 2,910,377 | A | | 10/1959 | Owen | ......................... 428/509 |
| 3,152,904 | A | | 10/1964 | Sorensen | ..................... 430/566 |
| 3,457,057 | A | | 7/1969 | Morgan et al. | ................ 65/114 |
| 5,107,332 | A | * | 4/1992 | Chan | ........................... 358/518 |
| 5,452,112 | A | * | 9/1995 | Wan et al. | ................... 358/504 |
| 5,859,933 | A | * | 1/1999 | Sasanuma et al. | ........... 382/275 |

FOREIGN PATENT DOCUMENTS

| JP | 43-4929 B | 4/1943 |
| JP | 11-038517 A | 2/1999 |

* cited by examiner

Primary Examiner—Hai Pham
(74) Attorney, Agent, or Firm—Sughrue Mion, PLLC

(57) ABSTRACT

Upon adjustment before the adjustment of a heat development recording apparatus, a continuous recording pattern is outputted. The recording density of this continuous recording pattern is measured by a recording density measuring unit. A shading correction table for each pixel is formed and the shading correction table is registered in a storing unit. On the other hand, after the heat development recording apparatus is shipped without mounting the recording density measuring unit thereon, a discrete recording pattern is outputted. The recording density of the discrete recording pattern is measured for each discrete recording position to generate a shading correction table. The shading correction table registered in the storing unit is updated. Therefore, it is possible to reduce a cost while a good shading correction function is ensured.

3 Claims, 6 Drawing Sheets

SHADING CORRECTION METHOD FOR HEAT DEVELOPMENT RECORDING APPARATUS AND HEAT DEVELOPMENT RECORDING APPARATUS

BACKGROUND OF THE INVENTION

1. Field of the Invention

The present invention relates to a shading correction method for a heat development recording apparatus in which a heat development recording material is exposed to a laser beam, and then, the heat development recording material is thermally developed and a heat development recording apparatus.

2. Description of the Related Art

In recent years, the amount of processed waste liquid has been eagerly requested to decrease from the viewpoints of environmental protection and space saving in a medical field. Thus, a technique concerning photosensitive and heat development photographic materials utilized for a medical diagnosis and a usage of photographic technique which can be efficiently exposed by a laser image setter or a laser imager and can form a clear black image having a high resolution and a sharpness has been required. These photosensitive heat development recording materials allow the use of solution type processing chemicals to be eliminated and a simpler heat development processing system which does not degrade an environment to be supplied to customers.

The same requests are likewise present in the field of ordinary image forming materials. However, since a medical image needs a fine description, the image needs a high image quality excellent in its sharpness and graininess. In addition, a cold black-tone image is characteristically preferable in view of easiness for diagnosis. Although various kinds of hard copy systems using pigments and dyes such as ink jet printers, electro-photography, etc. are currently distributed as ordinary image forming systems, they are not satisfactory as output systems of medical images.

As compared therewith, in recent years, a recording apparatus based on a dry system in which a wet process is not carried out has been paid attention to. In such a recording apparatus, a film composed of a photosensitive and heat sensitive recording material (photosensitive heat sensitive recording material) or a heat development photosensitive material is employed. The material is referred to as a "heat development recording material" or a "heat development photosensitive material", hereinafter. In the recording apparatus based on the dry system, the heat development recording material is irradiated with a laser beam (scanned) in an exposure unit to form a latent image. Then, the heat development recording material is allowed to come into contact with heating means to perform a heat development in a heat development unit. Then, the heat development recording material is cooled to deliver outside the heat development recording material on which an image is formed. The dry system can solve a problem of waste liquid treatment as compared with the wet process.

A heat image system using organic silver salt as described above is disclosed in, for instance, the specifications of U.S. Pat. Nos. 3,152,904 and 3,457,075 and "Thermally Processed Silver Systems" by B. Shely (Imaging Processes and Materials; the eighth edition of Neblette edited by Sturge, V, Walworth and A. Shepp, P2, 1996). Especially, the heat development recording material has a photosensitive layer in which a photo-catalyst having a catalytic activation amount (for example, halogenated silver), a reducing agent, reducible silver salt (for example, organic silver salt) and a color tone agent for controlling the color tone of silver as required are dispersed in the matrix of a binder. The heat development recording material is heated to high temperature (for instance, 80° C. or higher) after the exposure of an image. Then, a black silver image is formed by an oxidation-reduction reaction between the halogenated silver or reducible silver salt (functions as an oxidizing agent) and the reducing agent. The oxidation-reduction reaction is accelerated by the catalytic action of the latent image of the halogenated silver generated by the exposure. Therefore, the black silver image is formed in an exposure area. Fuji Medical Dry Measure FM-DPL was disclosed in many documents such as U.S. Pat. No. 2,910,377 and JP-B-43-4924 and then sold as a medical image forming system by using a heat development recording material.

In a production of the heat image forming system using the organic silver salt, a method for producing the system by applying a solvent and a method for producing the system by applying and drying application liquid containing polymer micro particles dispersed in water as a main binder are included. The latter method does not need a step of recovering the solvent, so that a production facility is simple and advantageous for a mass-production.

In such a heat development type image recording, even when a record having uniform density is carried out, what is called shading that unevenness in recording density is generated in a main scanning direction is caused due to the characteristics of the recording apparatus itself. Accordingly, the quality of a recorded image is inconveniently deteriorated. Causes thereof may possibly include unevenness in reflection factor of a polygon mirror scanned by laser beam for exposure, unevenness in transmission factor of a lens or unevenness in temperature of a heat development unit or the like.

In order to prevent the quality of an image due to the above-described shading, what is called a shading correction that the unevenness in the recording density due to shading is corrected is carried out. This shading correction is disclosed in, for example, JP-A-11-38517 and performed as described below. Firstly, a recording operation by the image data of uniform density in the main scanning direction is performed and the density of the recorded image is continuously measured along the main scanning direction by a desitometer incorporated in the recording apparatus. Then, shading correction data (correcting conditions) that the recording density distribution for all pixels is uniform is calculated for each pixel and a shading correction table is formed by collecting together the shading correction data corresponding to each pixel. Upon actually recording an image, image data supplied from an image data supply source is corrected for each pixel by using the shading correction data read from the shading correction table to carry out the shading correction.

In the above-described recording apparatus, in order to carry out the above-described shading correction, a recording density measuring unit for continuously measuring the recording density of a recorded image in a main scanning direction has been incorporated in the recording apparatus. This recording density measuring unit comprises a light source for uniformly applying light to a recording medium along a main scanning direction and a photoreceptor for detecting the light reflected on the surface of the recording medium which is irradiated with the light from the light source along the main scanning direction. The recording density measuring unit is highly accurate and expensive.

A user side that uses the recording apparatus also needs such a shading correction to be periodically carried out. When the shading correction is carried out only once in the density measuring unit before the recording apparatus is shipped, so much unevenness in recording density is not generated after that.

Accordingly, for the purpose of the shading correction after shipping that rarely needs accuracy, the incorporation of the highly accurate and expensive density measuring unit inconveniently causes much wastefulness and does not achieve low cost.

SUMMARY OF THE INVENTION

It is an object of the present invention to solve the problems of the related art and provide a shading correction method for a heat development recording apparatus and a heat development recording apparatus in which while a good shading correction function is maintained, the increase of cost due to mounting of a highly accurate and expensive density measuring unit can be suppressed.

The invention provides A shading correction method for a heat development recording apparatus which exposes a heat development recording material including a heat development and photosensitive material or a photosensitive and heat sensitive recording material to a laser beam to form a latent image on the heat development recording material and performs heat development for the heat development recording material on which the latent image is formed, having the steps of: before the heat development recording apparatus is shipped, continuously outputting a continuous recording pattern to a recording surface, measuring recording density of the continuous recording pattern by a recording density measuring unit, generating a shading correction table for each pixel, and registering the shading correction table in a storing unit; and after the heat development recording apparatus is shipped without mounting the recording density measuring unit thereon, outputting a discrete recording pattern, measuring recording density of the discrete recording pattern for each discrete recording position, forming another shading correction table, and updating the shading correction table registered in the storing unit.

In the shading correction method for the heat development recording apparatus, the recording density of the continuous recording pattern is precisely measured by using the recording density measuring unit to perform a shading correction. Then, a highly accurate and expensive recording density measuring unit used when the shading correction is carried out is removed and the heat development recording apparatus is shipped without mounting the recording density measuring unit thereon. After the heat development recording apparatus is shipped, the discrete recording pattern is outputted. The recording density of the discrete recording pattern is obtained for each discrete recording position by using, for instance, an inexpensive marketed densitometer to correct shading. Accordingly, the cost of the heat development recording apparatus itself can be realized. Further, the shading correction after the heat development recording apparatus is shipped may be carried out only by measuring the density for each of discretely recorded positions. Thus, the recording density can be simply measured.

Further, the continuous recording pattern and the discrete recording pattern are recorded with recording density including a plurality of half tone densities, and a shading correction of all gradation densities is performed by interpolating each intermediate recording density between one and another.

In this shading method for the heat development recording apparatus, the continuous recording pattern and the discrete recording pattern are recorded with a plurality of recording densities including half tone densities. Further, the recording densities are interpolated so that a shading correction of all gradation densities can be carried out and a more accurate shading correction can be carried out.

The invention provides a heat development recording apparatus which exposes a heat development recording material including a heat development and photosensitive material or a photosensitive and heat sensitive recording material to a laser beam to form a latent image on the heat development recording material and performs heat development for the heat development recording material on which the latent image is formed, has: a control unit which generates a shading correction table on the basis of measured results of the recording densities of an shading correction pattern which is output and corrects densities upon heat development, wherein the control unit involves a connecting unit for inputting measured results of recording densities from a first recording density measuring unit for measuring a recording density for each pixel of a first shading correction pattern which is continuously recorded on a recording surface and a second recording density measuring unit for measuring a recording density at each discrete recording position of a second shading correction pattern which is discretely recorded on the recording surface.

In this heat development recording apparatus, before the recording apparatus is shipped, the first shading correction pattern continuously recorded on the recording surface can undergo a highly accurate shading correction by employing the first accurate recording density measuring unit for measuring the recording density for each pixel. Further, after the recording apparatus is shipped, the second shading correction pattern discretely recorded on the recording surface can undergo a simple shading correction by employing the second recording density measuring unit for measuring the recording density for each discrete recording position. Accordingly, an expensive recording density measuring unit does not need to be mounted on the heat development recording apparatus and a cost can be decreased. Further, the shading correction after shipment of the heat development recording apparatus may be carried out only by measuring the density for each discretely recorded position. Consequently, the recording density can be simply measured.

As an adjustment upon shipment from a factory, the highly accurate shading correction by the continuous recording pattern and the simple shading correction by the discrete recording pattern may be selectively set. In this case, either of these corrections may be performed or both the corrections may be performed.

DETAILED DESCRIPTION OF THE PREFERRED EMBODIMENTS

Figure 1:
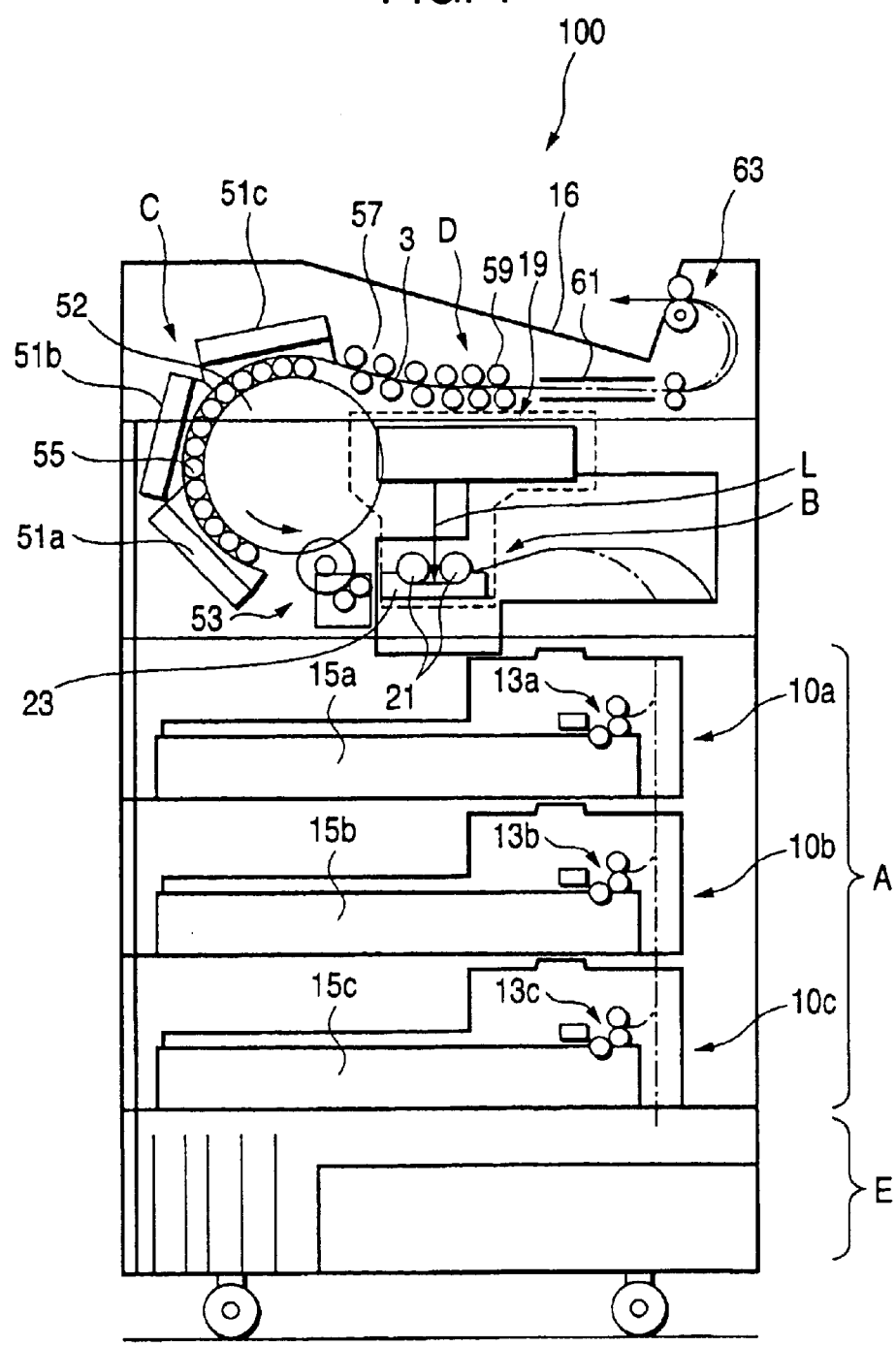
FIG. 1 is a schematic view of a heat development recording apparatus according to the present invention.

Now, referring to the drawings, preferred embodiments of a shading correction method for a heat development recording apparatus and a heat development recording apparatus according to the present invention will be described in detail.

FIG. 1 shows a schematic side view of a heat development recording apparatus according to the present invention. A heat development recording apparatus 100 is generally an apparatus that uses a heat development recording material requiring no wet type developing process, exposes the heat development recording material by scanning and exposure by light beam L composed of laser beam to form a latent image, then, obtains a visible image by carrying out a heat development, and cools the heat development recording material having the visible image to ordinary temperature and outputs the heat development recording material.

The heat development recording apparatus 100 is basically provided with a heat development recording material supply part A, an image exposure part B, a heat development part C, a cooling part D, conveying means provided in main parts between respective parts to convey the heat development recording material and a power source/control part E for driving and controlling the respective parts in order of the conveying direction of the heat development recording material. In this heat development recording apparatus 100, the power source/control part E is arranged in a lowermost stage. The heat development recording material supply part A is disposed in the upper stage thereof. Further, the image exposure part B, the heat development part C and the cooling part D are disposed in the upper stage thereof. The image exposure part B is arranged adjacently to the heat development part C. In this structure, an exposure step and a heat development step can be carried out within a short conveying distance. The length of a conveying path of the heat development recording material can be made shortest. An output time of one sheet of heat development recording materials can be shortened. Further, both an exposure step and a heat development step can be carried out for one sheet of the heat development recording materials at the same time.

As the heat development recording material, a heat development photosensitive material or a photosensitive and heat sensitive material can be employed. The heat development photosensitive material is a recording material for recording (scanning and exposing) an image by light beam (for instance, laser beam), then, thermally developing the image and generating color. Further, the photosensitive and heat sensitive recording material is a recording material for recording an image by light beam, and then, thermally developing the image to generate color, or a recording material for recording an image by the heat mode (heat) of laser beam and generating color at the same time, and then fixing the image by irradiating the image with light.

The heat development recording material supply part A is a part for taking out the heat development recording materials one sheet by one sheet and supplying them to the image exposure part B located in the downstream side in the conveying direction of the heat development recording materials. The heat development recording material supply part A includes charging units 10a, 10b, and 10c of three upper and lower stages, pairs of supply rollers 13a, 13b and 13c respectively arranged in the charging units, a conveying roller and a conveying guide which are not illustrated. Into the charging units 10a, 10b and 10c having a three-stage structure, magazines 15a, 15b and 15c in which the heat development recording materials having different size and different orientations (for instance, B4 size or half-cut size, etc.) are accommodated are inserted. Thus, the heat development recording materials having the different size or orientations with which the respective stages are charged can be selectively used.

The heat development recording materials are processed in the shapes of sheets. The heat development recording materials are ordinarily formed as a laminated body (bundle) of a prescribed unit (100 sheets or the like) and packed in a bag or a belt form as a package. The packages are respectively accommodated in the magazines and charged respectively in the stages of the heat development recording material supply part A.

The image exposure part B scans and exposes the heat development recording material conveyed from the heat development recording material supply part A in a main scanning direction (direction perpendicular to the surface of a sheet of FIG. 1) by light beam L. Further, the image exposure part B conveys the heat development recording material in a sub-scanning direction (that is, a conveying direction) substantially perpendicular to the main scanning direction to record a desired image on the heat development recording material and form a latent image.

The heat development part C conveys the scanned and exposed heat development recording material and raises the temperature to perform a heat development. Then, the heat development recording material after a developing process is cooled in the cooling part D and ejected to an ejection tray.

This image exposure part B specifically includes a guide plate 23 on the upper surface of which the heat development recording material slides and moves, two driving rollers 21 for pressing and conveying the heat development recording material on the upper surface of the guide plate 23 and a scanning exposure unit 19 for scanning and exposing the heat development recording material by the light beam L in a space between the two driving rollers 21.

The heat development part C serves to heat the heat development recording material to be thermally treated of a type to which a heat treatment is applied. In the structure of the heat development part C, as shown in FIG. 1, a plurality of plate heaters 51a, 51b and 51c arranged in the moving direction of the heat development recording material are bent as a heating body. The heating body reaches temperature necessary for processing the heat development recording material 3. These plate heaters 51a, 51b and 51c are arranged in a series of circular arc shaped arrangement.

Specifically, as the structure of the heat development part C including the plate heaters 51a, 51b and 51c, each plate heater has a concave surface as shown in the drawing. The heat development recording material 3 is allowed to come into contact with and slide on the concave surfaces of the plate heaters and move relative thereto. At this time, as conveying means of the heat development recording material 3, a supply roller 53 and a plurality of pressing rollers 55 serving to transfer heat to the heat development recording material 3 from the plate heaters respectively are arranged. The pressing rollers 55 abut on the peripheral surface of a drum 52 and are driven to rotate following the rotation of the drum 52. As these pressing rollers 55, metallic rollers, resin rollers, rubber rollers or the like may be used. Then, at the terminal end of a conveying path of the heat development recording material 3 in the heat development part C, ejection rollers 57 for moving the heat development recording material are disposed.

According to this structure, since the conveyed heat development recording material 3 is pressed to the plate heaters 51a, 51b and 51c and conveyed, the heat development recording material 3 is prevented from buckling.

Then, the heat development recording material 3 discharged from the heat development part C is cooled in the cooling part D by paying attention not to produce wrinkles and a way of bending. The heat development recording material 3 discharged from the cooling part D is guided to a guide plate 61 by a pair of cooling rollers 59 provided halfway the conveying path and further ejected to the ejection tray 16 from a pair ejection rollers 63.

In the heat development recording apparatus 100, a recording density measuring unit, the illustration of which is omitted, for measuring the recording density of a recorded image is connected to a connecting unit as a separate body from the heat development recording apparatus 100.

Figure 2:
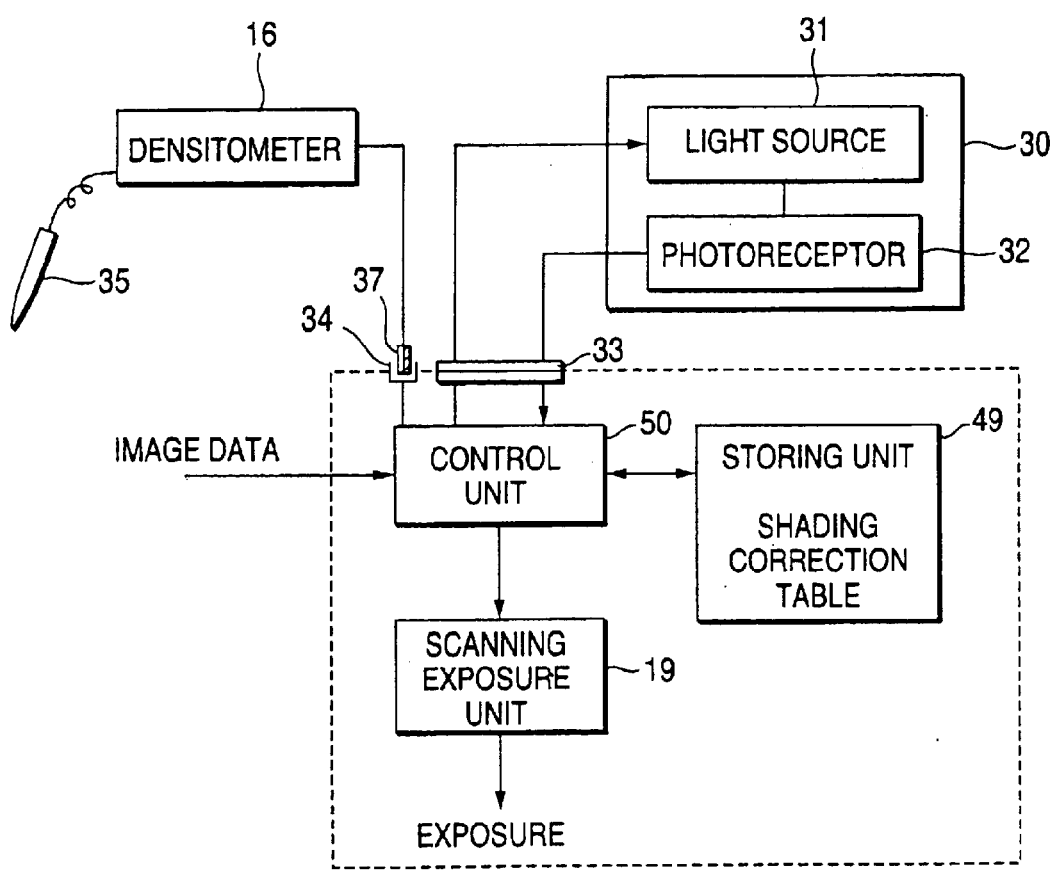
FIG. 2 is a block diagram of a control system for a shading correction according to the present invention.

FIG. 2 is a block diagram showing the structure of a recording control system of the heat development recording apparatus 100. The recording control system basically has a control unit 50 for controlling exposure conditions for correcting the shading of inputted image data or the like, a storing unit 49 for storing various kinds of data (shading correction table, etc) for the shading correction and a scanning exposure unit 19 for receiving a shading-corrected image signal and emitting exposure light to the heat development recording material.

To the control unit 50, the above-described recording density measuring unit (first recording density measuring means) 30 having a light source 31 and a photoreceptor 32 for measuring the recording density of the heat development recording material is connected through a connector (connecting unit) 33 to input a measured recording density value.

In the heat development recording apparatus 100, an external terminal (connecting unit) 34 connected to the control unit 50 is provided. To the external terminal 34, for instance, a connecting terminal 37 of a marketed densitometer 36 (second density measuring means) is connected to input a measured recording density value. This densitometer 36 is a simple measuring meter in which a probe 35 is allowed to come into contact with a part to be measured to detect the density of the contact part.

Now, a shading correction method according to the present invention will be described in detail.

Figure 3:
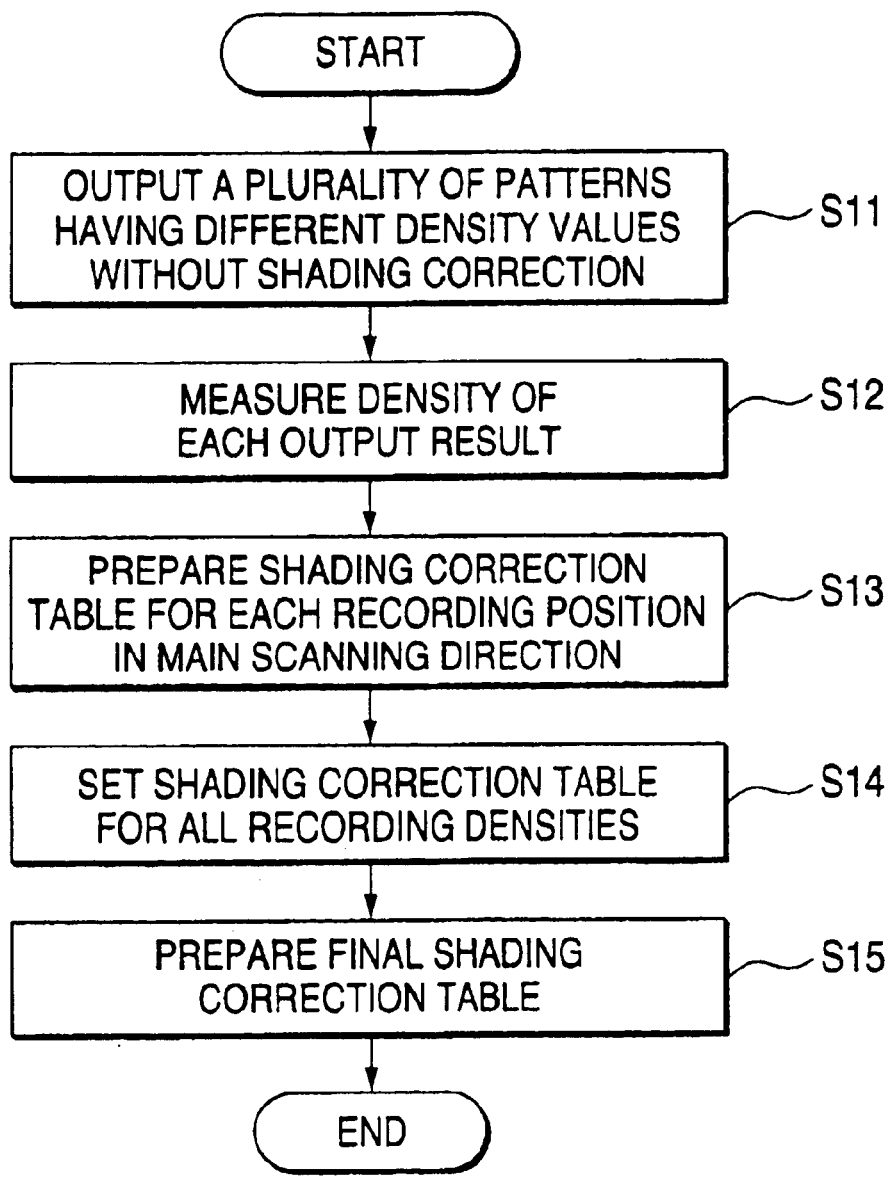
FIG. 3 is a flow chart showing a procedure for performing a shading correction.

A flow chart showing the procedure of a shading correction is shown in FIG. 3. The density of a recorded image is determined by controlling the exposure value of laser beam. Therefore, to carry out the shading correction, a plurality of correcting patterns having known different density values are outputted (step 11) as density samples without performing a shading correction. Then, each recording density is measured (step S12) by the recording density measuring unit 30 from the output result of each density sample. For example, two samples having different recording densities including the correcting pattern of intermediate density and the correcting pattern of high density are outputted to measure actual density values.

Figure 4:
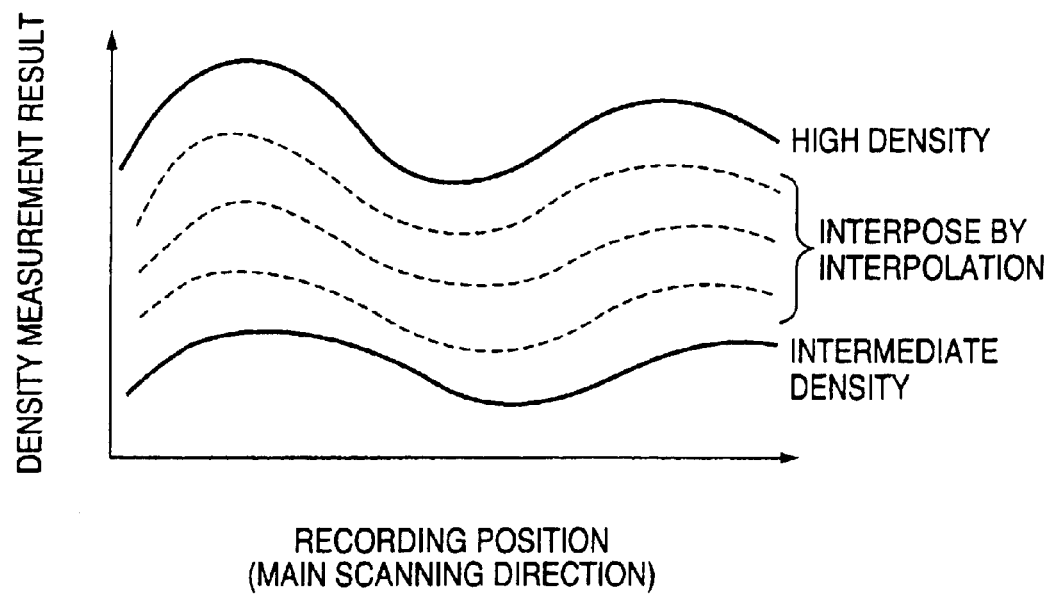
FIG. 4 is an explanatory view showing results obtained by outputting the image data of intermediate density and high density and measuring densities to measure densities and a state of an interpolating calculation of a range from the intermediate density to the high density.

Then, these recording density measuring values are used to generate a shading correction table (step S13) for each recording position (pixel in a main scanning direction) corresponding to each output recording density value. Then, a shading correction table for all the recording densities is set on the basis thereof (step S14). For example, as the density measuring results of the intermediate density and the high density for recording positions in the main scanning direction, the density measuring results having respectively different distribution forms are obtained as shown in FIG. 4. In step S13, when the densities of two image density samples of the intermediate density and the high density are measured, the density measuring values between the intermediate density and the high density are obtained by an interpolating calculation based on the density measuring results of the intermediate density and the high density which are actually measured by the density measuring unit 30 in step S14, and then, the obtained density measuring values are interposed. Thus, the shading correction table for all the recording densities is formed for each of the recording positions. Then, a final shading correction table used upon actual operation is formed on the basis of the shading correction table obtained in step S14 (step S15).

The shading correction table generated herein is a collection of correcting data to be corrected for each pixel so that each recording density corresponds to a specified recording density. These correcting data is stored in the storing unit 49 and suitably read and used. In the above-described shading correction, when the shading cannot be adequately corrected once by a correction process, the shading correction may be repeated again relative to the correcting pattern after the shading correction. Thus, a more assured shading correction can be achieved.

Then, such heat development recording apparatuses 100 need to periodically carry out a shading correction to constantly record an image of high quality. However, when the shading correction pattern is continuously scanned by using the recording density measuring unit 30 to perform the shading correction for each pixel, so much accurate shading correction is not necessary after that. That is, a user side using the heat development recording apparatus 100 can realize a necessary and adequate correction even by a slightly rough shading correction.

Therefore, in the above-described heat development recording apparatus 100, different shading corrections are performed between a step before a shipment in a factory and a step after the shipment in the user side. Here, methods for the shading corrections in the factory side before the shipment of the apparatus and the user side after the shipment will be described below by referring to FIG. 5.

(Factory Side before Shipment)

The recording density measuring unit 30 connected to the control unit 50 through the connector 33 is attached to the heat development recording apparatus 100. Under this state, the shading correction is started in the heat development recording apparatus 100.

In such a way, the heat development recording apparatus 100 records a shading correction pattern Fp as a continuous recording pattern which is continuous in the direction of width as shown in the drawing (S31).

Figure 5:
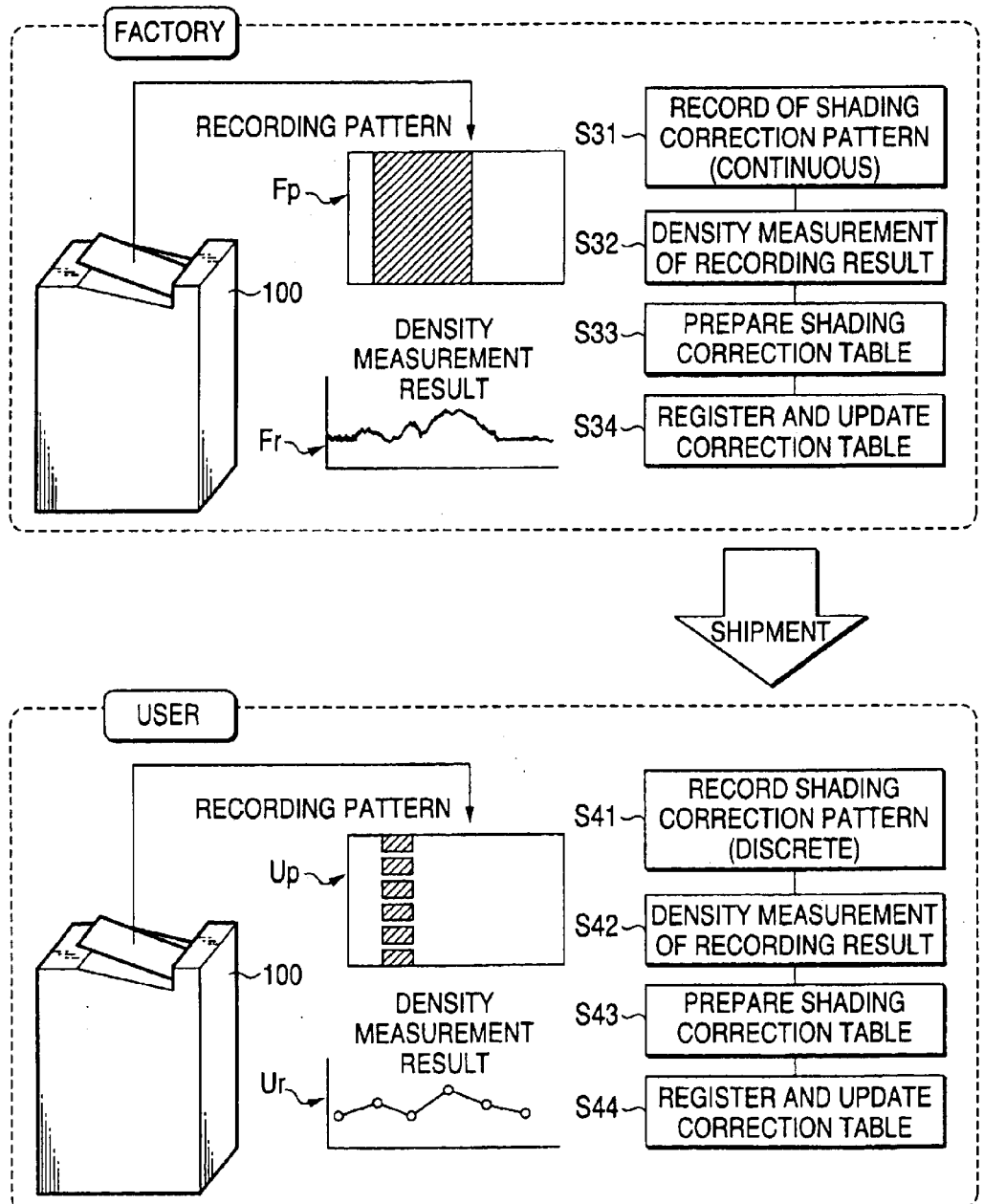
FIG. 5 is an explanatory view for explaining a method for correcting the shading.

Then, the recording density of the shading correction pattern Fp is scanned and measured widthwise by the density measuring unit 30. Thus, a density measuring result Fr as shown in FIG. 5 is obtained (S32).

Subsequently, the control unit 50 forms the shading correction table (S33) for each pixel by the above-described method based on the obtained density measuring result.

The formed shading correction table is registered in the storing art 49 (S34).

Then, the shading correction table for each pixel is derived for each density. Then, the output intensity of laser beam upon exposure is corrected based on the shading correction table and an image is recorded with a proper density.

In such a manner, when the shading correction is completed, the recording density measuring unit 30 is pulled out from the connector 33 and the recording density measuring unit 30 is removed from the heat development recording apparatus 100.

The removed recording density measuring unit 30 is attached to another heat development recording apparatus 100 for performing a shading correction and used again when the shading correction is carried out.

(User Side After Shipment)

The shading correction is started in the heat development recording apparatus 100. At this time, in the heat development recording apparatus 100, the connecting terminal 37 of the marketed densitometer 36 is connected to the external terminal 34 connected to the control unit 50. The heat development recording apparatus 100 records a shading correction pattern Up (S41) as a discrete recording pattern that a plurality of images are discretely recorded at prescribed intervals in the direction of width as shown in the drawing.

While the above-described shading correction pattern Fp is a continuous pattern on a recording surface including the intermediate recording density, this shading correction pattern Up is a pattern that a recording area is discrete at prescribed intervals on a recording surface including the intermediate recording density.

Then, the probe 35 of the densitometer 36 is sequentially aligned with the images of the shading correction pattern Up from one side of the direction of width to measure the recording densities. In such a way, the recording densities of the images of the shading correction pattern Up are measured in order by the densitometer 36. Thus, a density measuring result Ur that respective measured values are connected together as shown in the drawing is obtained (S42).

After that, the control unit 50 forms the shading correction table for each pixel based on the obtained density measuring result Ur by the above-described method (S43). At this time, the measuring positions of the recording densities can be simply set by using the shading correction pattern Up of the discrete recording pattern. In the continuous recording pattern, measuring positions need to be set by the user side so that a troublesome labor of previously measuring and setting the measuring positions is caused. However, in a method using the discrete recording pattern, the positions can be set only by aligning the probe 35 with the recorded discrete area. Thus, the recording densities can be measured with a necessary and adequate accuracy by a simple operation.

Then, the generated shading correction table is transmitted to the storing unit 49 and updated (S44). After that, the shading correction is performed as described above, the connecting terminal 37 of the densitometer 36 is pulled out from the external terminal 34 and the densitometer 36 is removed from the heat development recording apparatus 100.

After that, the output intensity of laser beam upon exposure is corrected based on the shading correction table and an image is recorded with a proper density.

As described above, after the density of the shading correction pattern Fp is precisely measured by using the density measuring unit 30 to carry out the shading correction, the heat development recording apparatus is shipped. At this time, the heat development recording apparatus is shipped under a state that the highly accurate and expensive density measuring unit 30 used when the shading correction is carried out is not mounted thereon. After the shipment, for example, the marketed inexpensive densitometer 36 is used to measure the recording density of the shading correction pattern Up, and then, the shading correction table is updated. Accordingly, the cost of the heat development recording apparatus 100 itself can be greatly reduced.

That is, the shading correction pattern Up is formed as the discrete recording pattern which is recorded under a state that the recording area is discrete at prescribed intervals with a known distance. The recording densities are respectively measured at respective single points located at prescribed intervals. The obtained density values and known position data are used to carry out the shading correction. Thus, the recording densities can be simply measured. Further, as the densitometer, even a marketed measuring device with low accuracy for measuring the density of each point by the probe 35 or the like can be used with an adequate accuracy.

As an adjustment upon shipment from the factory, the highly accurate shading correction by the continuous recording pattern and the simple shading correction by the discrete recording pattern may be selectively set except the above-described shading correction method. In this case, either of the corrections or both the corrections may be carried out and may be arbitrarily set to meet the purpose.

Further, in the above-described embodiment, although the shading correction is carried out by one recording density value, the present invention is not limited thereto. The continuous recording patterns or the discrete recording patterns are preferably outputted with a plurality of recording densities including an intermediate tone density to carry out the shading corrections respectively to the recording densities. Thus, the shading correction relative to all gradation densities can be performed to exceptionally improve a shading correction accuracy.

Now, one specific example until the shading correction table is generated will be described below. An example described below is a shading correction method upon recording an image by a plurality of intermediate tone densities.

For example, when the recording density is an intermediate density DM (when the density value OD ranges from 1.0 to 1.5, and is preferably 1.2), density correction data is CM. When a high density DH (when the density value OD ranges from 2.5 to 3.7 and is preferably 3), density correction data is CH. In these cases, density correction data $C(i)$ corresponding to a main scanning position is obtained by the following formula (1).

$$C(i) = \alpha CM + \beta CH \tag{1}$$

Here, "i" represents a recording position (that is, a pixel number) in a main scanning direction. Further, $\alpha$ and $\beta$ designate weight coefficients (in this case, $\alpha+\beta=1$). The values of "$\alpha$" and "$\beta$" are changed depending on the recording density, that is, image data. For instance, when an image recorded by the pixel "i" has a high density, "$\beta$" is increased. On the contrary, when the image has a low density, "$\alpha$" is increased.

As one example, when density correction data located within a density range hardly affected by a correction is set to a prescribed value for simplifying a calculation, the weight coefficients $\alpha$ and $\beta$ are set as described below depending on the range of the recording density. In this case, $D(i)$ designates a recording density in the main scanning position (i).

(1) When $D(i)$ is not larger than DM:, $\alpha$ is set to 1 and $\beta$ is set to 0 and $C(i)$ is fixed to CM.
(2) When $D(i)$ is not smaller than DH:, $\alpha$ is set to 0 and $\beta$ is set to 1 and $C(i)$ is fixed to CH.
(3) When $D(i)$ is larger than DM and smaller than DH:, $$C(i) = \alpha\, CM + \beta\, CH \tag{2}$$

In this case, $\alpha+\beta=1$

Figure 6:
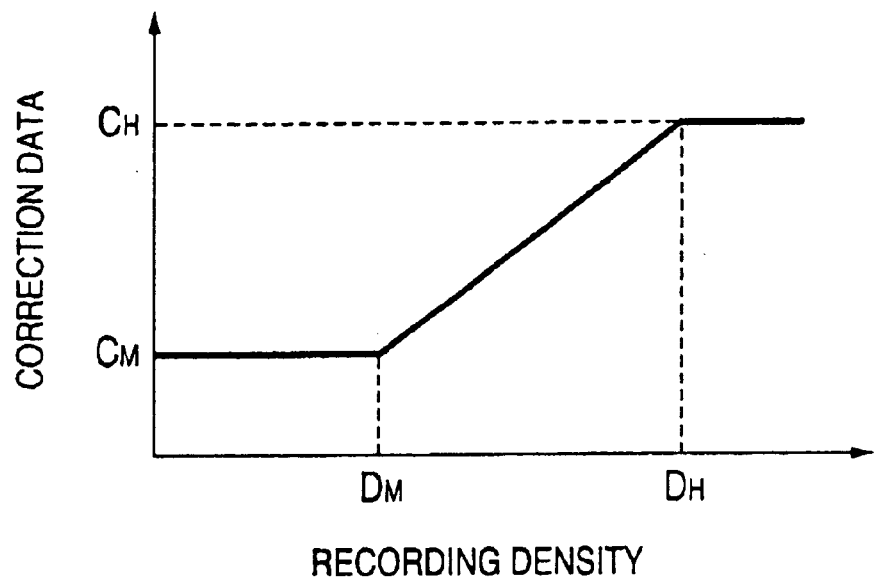
FIG. 6 shows an example of a relation between a recording density and correction data when the shading correction is carried out.

The correction data for each recording density may be calculated in such a manner as described above. Preferably, the typical correction data (CM, CH) may be used and remaining correction data may be linearly interpolated and interposed. FIG. 6 shows an example of the linearly interpolated correction data. As shown in FIG. 6, correction data $C(i)$ is obtained as describe below depending on the density value $D(i)$ of image data.

(1) $D(i)$ is not larger than DM:, $C(i)$ is fixed to CM.
(2) $D(i)$ is not smaller than DH:, $C(i)$ is fixed to CH.
(3) When $D(i)$ is not smaller than DM and not larger than DH:, $$C(i) = [\{D(i)-DM\}CH + \{DH-D(i)\}CM]/(DH-DM) \tag{3}$$

Then, the shading correction table as the collection of shading collection data including the above-described correction data is determined in accordance with the following formula. Assuming that data after the shading correction is $RD(i)$, the density of image data is $D(i)$, density correction data is $C(i)$ and density correction data due to other unevenness factors is $K(i)$, $RD(i)$ is represented by the following formula (4).

$$RD(i)=f\{C(i), K(i)\} \cdot D(i) \quad (4)$$

The collection of data represented by the formula (4) is prepared as the shading correction table. Then, the output strength or output intensity of laser beam upon exposure is corrected based on the shading correction table. Specifically, the pulse (width or number) modulation or the strength modulation of laser beam is performed on the basis of the corrected strength. Thus, an image can be recorded with a proper density irrespective of the recording density and the recording position.

Figure 7:
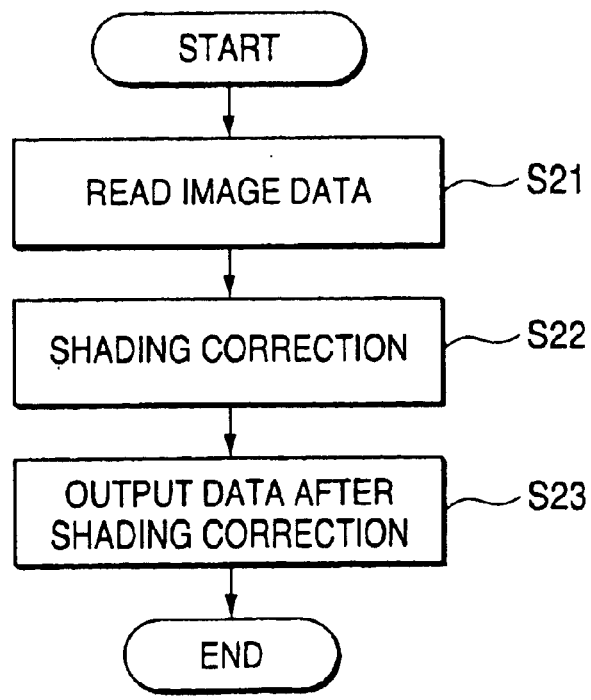
FIG. 7 is a flow chart showing a control procedure when the shading correction is carried out.

Accordingly, as a control until an exposure, image data is firstly read in step S21 as shown in FIG. 7. Then, the shading correction of the image data is performed in accordance with the above-described formula (4) in step S22. Then, finally, an exposure is controlled on the basis of the corrected image data in step S23.

In the above-described embodiment, a case that the two recording densities of the intermediate density DM and the high density DH are sampled and the shading correction of the range from the intermediate density to the high density is carried out is described. However, a low density DL (density value OD ranges from 0.3 to 0.7 and is preferably 0.5) may be sampled and the shading correction of a range from the low density to the intermediate density to the high density may be carried out.

As described above, a linear interpolation is carried out between the densities to simply pick up some samples of typical recording densities, so that a fine correction can be performed. When the shading correction of the intermediate density to the high density is carried out on the basis of the shading correction table prepared for each recording density, the unevenness in the recording density peculiar to the heat development recording system can be effectively eliminated. Further, when the recording densities to be corrected are also extended to the low—density side, a proper shading correction can be applied to the recording densities located within a wide range. Consequently, an image having a higher quality can be recorded.

When the above-described shading correction was carried out by using the DI-AL Em. No. 51151 (the term of validity: December in 2003) produced by Fuji Photo Film Co., Ltd., a good correction result could be obtained.

As described above, according to the shading correction method for the heat development recording apparatus and the heat development recording apparatus of the present embodiment, the density of the shading correction pattern of the continuous recording pattern is precisely measured by using the density measuring unit to correct a shading. Then, the heat development recording apparatus is shipped without mounting the highly accurate and expensive density measuring unit used when the shading correction is performed. After the shipment of the heat development recording apparatus, the shading correction pattern of the discrete recording pattern is outputted to discretely measure the density by, for instance, a marketed inexpensive densitometer and carry out the shading correction. Accordingly, the cost of the apparatus itself can be reduced.

What is claimed is:

1. A shading correction method for a heat development recording apparatus which exposes a heat development recording material including a heat development and photosensitive material or a photosensitive and heat sensitive recording mate alto a laser beam to form a latent image on the heat development recording material and performs heat development for the heat development recording material on which the latent image is formed, comprising the steps of:

before the heat development recording apparatus is shipped, continuously outputting a continuous recording pattern to a recording surface, measuring recording density of the continuous recording pattern by a recording density measuring unit, generating a shading correction table for each pixel, and registering the shading correction table in storing unit; and after the heat development recording apparatus is shipped without mounting the recording density measuring unit thereon, outputting a discrete recording pattern, measuring recording density of the discrete recording pattern for each discrete recording position, generating another shading correction table, and updating the shading correction table registered in the storing unit.

2. The shading correction method for the heat development recording apparatus according to claim 1, wherein the continuous recording pattern and the discrete recording pattern are recorded with recording density including a plurality of half tone densities, and a shading correction of all gradation densities is performed by interpolating each intermediate recording density between one and another.

3. A heat development recording apparatus which exposes a heat development recording material including a heat development and photosensitive material or a photosensitive and heat sensitive recording material to a laser beam to form a latent image on the heat development recording material and performs heat development for the heat development recording material on which the latent image is formed, comprises:

a control unit which generates a shading correction table on the basis of measured results of the recording densities of a shading correction pattern which is output and corrects densities upon heat development, wherein the control unit involves a connection unit for inputting measured results of recording densities from a first recording density measuring unit for measuring a recording density for each pixel of a first shading correction pattern which is continuously recorded on a recording density at each discrete recording position of a second shading correction pattern which is discretely recorded on the recording surface.

* * * * *